(12) United States Patent
Newman

(10) Patent No.: US 9,241,510 B2
(45) Date of Patent: Jan. 26, 2016

(54) APPARATUS AND METHOD FOR OPTIMIZING AND CONTROLLING FOOD PROCESSING SYSTEM PERFORMANCE

(75) Inventor: Paul Bernard Newman, Fallbrook, CA (US)

(73) Assignee: ICS Solutions B.V., Amsterdam (NL)

( * ) Notice: Subject to any disclaimer, the term of this patent is extended or adjusted under 35 U.S.C. 154(b) by 0 days.

(21) Appl. No.: 13/450,693

(22) Filed: Apr. 19, 2012

(65) Prior Publication Data

US 2012/0269937 A1 Oct. 25, 2012

Related U.S. Application Data

(60) Provisional application No. 61/478,491, filed on Apr. 23, 2011.

(51) Int. Cl.
| | |
|---|---|
| *B65B 55/00* | (2006.01) |
| *A23L 3/00* | (2006.01) |
| *A23L 3/02* | (2006.01) |

(52) U.S. Cl.
CPC .. *A23L 3/003* (2013.01); *A23L 3/02* (2013.01)

(58) Field of Classification Search
CPC .................................. A23L 3/02; A47F 19/12
USPC ......... 426/231, 232, 233, 131, 132, 401, 407, 426/412, 521, 805; 99/383; 422/1, 3, 68.1
See application file for complete search history.

(56) References Cited

U.S. PATENT DOCUMENTS

| | | | |
|---|---|---|---|
| 1,419,139 | A | 6/1922 | Hunter |
| 1,868,996 | A | 7/1932 | Sharp |

(Continued)

FOREIGN PATENT DOCUMENTS

| | | | |
|---|---|---|---|
| DE | 881896 | | 7/1953 |

(Continued)

OTHER PUBLICATIONS

Fellows ("Chapter 12: Heat Sterilisation"), "Food Processing Technology: Principles and Practice", second edition, pub. 2000, p. 262.*

(Continued)

*Primary Examiner* — Preston Smith
(74) *Attorney, Agent, or Firm* — Christensen O'Connor Johnson Kindness PLLC

(57) ABSTRACT

Apparatus and Method for an intelligent, optimizing, pro-active process controller for use in all types of product processing systems are disclosed. The disclosed controller and its associated apparatus uniquely develop and dynamically optimize their process control capabilities through measuring, monitoring and analyzing product and product container attributes and performance while quantifying variability and can thus pro-actively track, trace and control overall processing performance down to an individual unit of production thereby optimizing product processing times, increasing capacity, improving product quality and reducing variability while enhancing treatment flexibility and food treatment safety in all types of food and drink processing systems, with particular reference to continuous food and drink processing systems.

| REFERENCES CITED | US patents | |
|---|---|---|
| 4,067,691 | January 1978 | McGady et al |
| 4,739,699 | April 1988 | Nelson et al |
| 4,816,269 | March 1989 | Nelson et al |
| 5,696,686 | December 1997 | Sanka et al |
| 5,872,359 | February 1999 | Stewart et al |
| 6,025,189 | February 2000 | Bolea et al |
| 6,148,249 | July 1996 | Newman |
| 6,416,711 | July 2002 | Weng |
| 6,440,361 | August 2002 | Weng |
| 6,472,008 | October 2002 | Weng |
| patent application 11/620,238 | July 2007 | Sands |
| patent application 11/883,740 | November 2007 | Mackay et al |
| patent application 12/231,211 | August 2008 | Olsen et al |
| patent application 61/079,185 | March 2009 | Newman |
| patent application 61/182,696 | May 2009 | Newman |
| patent application 61/478,190 | April 2011 | Newman |
| patent application 61/488,220 | May 2011 | Newman |
| | Foreign Patents | |
| EP0362975A2 | October 1989 | Ackermann |
| EP0808631A1 | November 1997 | Hucker |
| GB 2285126 | December 1993 | Newman |
| WO0221928A1 | March 2002 | Tottenham et at |
| WO0237975A2 | May 2002 | Niles |
| WO9807452A1 | February 1998 | Walker |

23 Claims, 1 Drawing Sheet

(56) References Cited

U.S. PATENT DOCUMENTS

| | | |
|---|---|---|
| 1,923,421 A | 8/1933 | Chapman |
| 2,556,385 A | 6/1951 | Allan |
| 2,595,708 A | 5/1952 | Salfisberg et al. |
| 2,633,284 A | 3/1953 | Moffett et al. |
| 2,660,512 A | 11/1953 | Webster |
| 2,806,423 A | 9/1957 | Van Der Winden |
| 2,818,012 A | 12/1957 | Webster |
| 2,870,954 A | 1/1959 | Kulesza |
| 2,968,232 A | 1/1961 | Carvallo |
| 2,976,988 A | 3/1961 | Schneider |
| 3,088,180 A | 5/1963 | Lauterbach |
| 3,286,619 A | 11/1966 | Lee |
| 3,377,173 A | 4/1968 | Winden |
| 3,394,793 A | 7/1968 | Reimers et al. |
| 3,407,721 A | 10/1968 | Carvallo |
| 3,469,988 A | 9/1969 | Yawger |
| 3,478,677 A | 11/1969 | Mencacci |
| 3,545,985 A | 12/1970 | Mencacci et al. |
| 3,637,132 A | 1/1972 | Gray |
| 3,927,976 A | 12/1975 | Reimers et al. |
| 3,960,670 A | 6/1976 | Pflug |
| 4,067,691 A | 1/1978 | McGady et al. |
| 4,116,117 A | 9/1978 | Bogaard |
| 4,196,225 A | 4/1980 | Mencacci |
| 4,206,299 A | 6/1980 | Yamazaki et al. |
| 4,295,566 A | 10/1981 | Vincek |
| 4,389,371 A | 6/1983 | Wilson et al. |
| 4,396,582 A | 8/1983 | Kodera |
| 4,476,263 A | 10/1984 | Owens |
| 4,522,015 A | 6/1985 | Hildebolt |
| 4,547,383 A | 10/1985 | Goldhahn |
| 4,631,115 A | 12/1986 | Berg et al. |
| 4,739,699 A | 4/1988 | Nelson et al. |
| 4,816,269 A | 3/1989 | Nelson et al. |
| 4,861,559 A | 8/1989 | Sugisawa et al. |
| 4,990,347 A | 2/1991 | Rasmussen et al. |
| 5,141,662 A | 8/1992 | Dexheimer et al. |
| 5,160,755 A | 11/1992 | Mignogna et al. |
| 5,218,829 A | 6/1993 | DeJarnette |
| 5,240,725 A * | 8/1993 | Akamatsu et al. ............ 426/233 |
| 5,283,033 A * | 2/1994 | Dodrill ............................ 422/21 |
| 5,307,985 A | 5/1994 | Beizermann |
| 5,351,828 A | 10/1994 | Becker et al. |
| 5,368,093 A | 11/1994 | Takehashi |
| 5,370,174 A | 12/1994 | Silvestrini et al. |
| 5,478,990 A * | 12/1995 | Montanari et al. ............ 235/375 |
| 5,484,547 A | 1/1996 | Mendoza |
| 5,696,686 A | 12/1997 | Sanka et al. |
| 5,711,984 A | 1/1998 | Woodward et al. |
| 5,747,085 A | 5/1998 | Veltman et al. |
| 5,759,486 A | 6/1998 | Peterson |
| 5,839,832 A | 11/1998 | Hagino |
| 5,857,312 A | 1/1999 | Walden |
| 5,872,359 A | 2/1999 | Stewart et al. |
| 5,894,929 A | 4/1999 | Kai et al. |
| 6,017,572 A | 1/2000 | Meyer |
| 6,025,189 A | 2/2000 | Bolea et al. |
| 6,071,474 A | 6/2000 | Martinsen et al. |
| 6,086,782 A | 7/2000 | Hsu et al. |
| 6,090,425 A | 7/2000 | Samimi |
| 6,096,358 A | 8/2000 | Murdick et al. |
| 6,148,249 A | 11/2000 | Newman |
| 6,251,337 B1 | 6/2001 | Kane |
| 6,389,828 B1 | 5/2002 | Thomas |
| 6,416,711 B2 | 7/2002 | Weng |
| 6,440,361 B2 | 8/2002 | Weng |
| 6,472,008 B2 | 10/2002 | Weng |
| 6,868,873 B2 | 3/2005 | Frisk |
| 7,008,501 B2 | 3/2006 | Lohwasser et al. |
| 7,008,659 B1 | 3/2006 | Ono |
| 7,141,102 B2 | 11/2006 | Fukutani et al. |
| 7,178,555 B2 | 2/2007 | Engel et al. |
| 7,396,521 B2 | 7/2008 | Hwang |
| 7,452,561 B2 | 11/2008 | Newman |
| 7,475,786 B2 | 1/2009 | McVay |
| 7,533,512 B2 | 5/2009 | Levati et al. |
| 7,543,455 B1 | 6/2009 | Chen |
| 7,666,457 B1 | 2/2010 | Lang et al. |
| 7,846,486 B2 | 12/2010 | Camu |
| 7,880,887 B2 | 2/2011 | Olson et al. |
| 7,985,349 B2 | 7/2011 | Yang et al. |
| 8,181,474 B2 | 5/2012 | Chen |
| 8,206,607 B2 | 6/2012 | Evans et al. |
| 8,479,532 B2 | 7/2013 | Cocchi et al. |
| 8,575,525 B2 | 11/2013 | Mackay et al. |
| 2001/0041150 A1* | 11/2001 | Weng ............................... 422/3 |
| 2003/0211212 A1 | 11/2003 | Belongia et al. |
| 2005/0040251 A1 | 2/2005 | Daly |
| 2005/0123435 A1 | 6/2005 | Cutler et al. |
| 2005/0253109 A1 | 11/2005 | Tran et al. |
| 2006/0038159 A1 | 2/2006 | Fukutani et al. |
| 2006/0051639 A1 | 3/2006 | Yang et al. |
| 2007/0122335 A1 | 5/2007 | Hwang |
| 2007/0160494 A1 | 7/2007 | Sands |
| 2007/0275178 A1 | 11/2007 | Nishi et al. |
| 2007/0293980 A1 | 12/2007 | Gudjonsson |
| 2008/0048147 A1 | 2/2008 | Eaton |
| 2008/0152537 A1 | 6/2008 | Wild et al. |
| 2008/0311259 A1 | 12/2008 | Singh et al. |
| 2008/0315152 A1 | 12/2008 | Daly |
| 2009/0057607 A1 | 3/2009 | Evans et al. |
| 2009/0081417 A1 | 3/2009 | Schmal et al. |
| 2009/0142223 A1 | 6/2009 | Hyde |
| 2009/0169693 A1 | 7/2009 | Hoffman |
| 2009/0178928 A1 | 7/2009 | Groos et al. |
| 2009/0191318 A1 | 7/2009 | Cocchi et al. |
| 2009/0238937 A1 | 9/2009 | Yamazaki et al. |
| 2009/0301118 A1 | 12/2009 | Chen |
| 2009/0301119 A1 | 12/2009 | Chen |
| 2010/0006796 A1 | 1/2010 | Yang et al. |
| 2010/0006798 A1 | 1/2010 | Yang et al. |
| 2010/0119670 A1 | 5/2010 | Mazzariello |
| 2010/0173060 A1 | 7/2010 | Perren et al. |
| 2010/0178404 A1 | 7/2010 | Yoakim et al. |
| 2011/0104350 A1 | 5/2011 | Clüsserath et al. |

FOREIGN PATENT DOCUMENTS

| | | |
|---|---|---|
| DE | 2334443 | 2/1975 |
| DE | 102009018489 | 10/2010 |
| EP | 362975 | 4/1990 |
| EP | 808631 | 11/1997 |
| EP | 990689 | 4/2000 |
| EP | 1359097 | 11/2003 |
| EP | 1964785 | 9/2008 |
| EP | 2177116 | 4/2010 |
| EP | 2223618 | 9/2010 |
| EP | 2574243 B1 | 4/2014 |
| GB | 1206061 | 9/1970 |
| GB | 2285126 | 6/1995 |
| GB | 2408440 | 6/2005 |
| GB | 2427601 | 1/2007 |
| GB | 2449288 | 11/2008 |
| JP | 2007-161807 | 6/2007 |
| JP | 2011012166 | 1/2011 |
| WO | 8804145 | 6/1988 |
| WO | 9611592 | 4/1996 |
| WO | 0027229 | 5/2000 |
| WO | WO 00/27227 A1 | 5/2000 |
| WO | 0221928 | 3/2002 |
| WO | 0237975 | 5/2002 |
| WO | 03018706 | 3/2003 |
| WO | WO 2004/017741 A1 | 3/2004 |
| WO | 2006092376 | 9/2006 |
| WO | 2007020469 | 2/2007 |
| WO | 9807452 | 2/2008 |
| WO | 2008093367 | 8/2008 |
| WO | 2009005767 | 1/2009 |
| WO | 2010092360 | 8/2010 |

OTHER PUBLICATIONS

N. Onita, et al. ("Estimation of the Specific Heat and Thermal Conductivity of Foods only by their Classes of Substances Contents

(56) References Cited

OTHER PUBLICATIONS (Water, Proteins, Fats, Carbohydrates, Fibers and Ash"). Scientific Researches. Agroalimentary Processes and Technologies, vol. XI, No. 1, pub. 2005, pp. 217-222.*
Final Office Action, U.S. Appl. No. 13/464,997, mailed May 23, 2014.
Response to Non-Final Office Action, U.S. Appl. No. 13/452,207, filed Jun. 5, 2014.
Decision to Grant, European Patent Application No. 12186224.7, mailed Mar. 27, 2014.
U.S. Appl. No. 13/449,718 , "Non-Final Office Action", Nov. 22, 2013, 12 pages.
U.S. Appl. No. 13/449,718 , "Response to Restriction Requirement", Oct. 28, 2013, 5 pages.
U.S. Appl. No. 13/449,718 , "Restriction Requirement", Sep. 26, 2013, 6 pages.
U.S. Appl. No. 13/452,207 , "Non-Final Office Action", Feb. 14, 2014, 6 pages.
U.S. Appl. No. 13/464,997 , "Non-Final Office Action", Sep. 12, 2013, 11 pages.
U.S. Appl. No. 13/464,997 , "Response to Non-Final Office Action", Jan. 13, 2014, 22 pages.
U.S. Appl. No. 13/464,997 , "Response to Restriction Requirement", May 1, 2013, 6 pages.
U.S. Appl. No. 13/464,997 , "Restriction Requirement", Apr. 5, 2013, 13 pages.
U.S. Appl. No. 13/624,411 , "Non-Final Office Action", Mar. 11, 2014, 8 pages.
U.S. Appl. No. 13/624,411 , "Response to Restriction Requirement", Feb. 19, 2014, 8 pages.
U.S. Appl. No. 13/624,411 , "Restriction Requirement", Dec. 19, 2013, 6 pages.
U.S. Appl. No. 61/079,185 , "Continuous Monitoring, Measuring and Controlling the Properties of Artificial Casings with Special Reference to Cellulose and Fibrous Casings", filed Mar. 2009.
U.S. Appl. No. 61/182,696 , "Printing of Data, Logos and Coded or Uncoded Information on Wet Surfaces and High Moisture Content, Natural, Unprocessed and Processed Foodstuffs.", filed May 2009.
U.S. Appl. No. 61/182,731 , "Continuous Monitoring, Measuring and Controlling the Properties of Webs, Films and Tubular Casings with Special Reference to Cellulose and Fibrous Casings", filed May 2010.
U.S. Appl. No. 61/478,190 , "Adaptive Packaging for Food Processing Systems", filed Apr. 22, 2011.
U.S. Appl. No. 61/478,491 , "Apparatus and Method for Optimizing and Controlling food processing performance especially in continuous sterilizing or pasteurizing systems", filed Apr. 23, 2011.
U.S. Appl. No. 61/478,665 , "Accelerating, Optimizing and Controlling product cooling in food processing systems especially continuous sterilizing or pasteurizing systems", filed Apr. 25, 2011.
U.S. Appl. No. 61/480,521 , "Novel Continuous and Flexible food and drink processing technology", filed Apr. 29, 2011.
U.S. Appl. No. 61/483,923 , "Method and Apparatus for Enhanced Performance of a Conventional Continuous Sterilizing System", filed May 9, 2011.
U.S. Appl. No. 61/488,220 , "Enhanced Product Capacity, Quality and Handling Flexibility Within a Conventional Continuous Food Processing System", filed May 20, 2011.
U.S. Appl. No. 61/540,010 , "Novel Thermal Transfer Media for Processing of Food and Drink Products", filed Sep. 28, 2011.
Ball , "Foundation of Food Process Calculation Methods", Sterilization in Food Technology, 1992, pp. 124-125.
Ball et al., "Heating Curve—Simple Logarithmic Temperature Rise", Sterilization in Food Technology, Theory, Practice and Calculations, 12:313-329.
Berlinet et al., "Effect of Pulp Redaction and Pasteurization on the Release of Aroma Compounds in Industrial Orange Juice", J. Food Sci., vol. 72, No. 8, Oct. 2007, pp. 5535-5543.
Best , "Physical Parameters of Cooling in Cryonics".

Bichier et al., "Thermal Processing of Canned Foods Under Mecheanical Agitation", Asme Heat Transfer Div Publ HTD; American Society of Mechanical Engineers, Heat Transfer in Food Processing, Abstract, 1993.
Browning et al., "Selecting and Maintaining Glycol Based Heat Transfer Fluids", Facilities Engineering Journal, Sep. 2010, pp. 16-18.
Casolari , Food Microbiology, 1994, vol. 11, pp. 75-84.
Chang et al., "Modeling Heat Transfer During Oven Roasting of Unstuffed Turkeys", Journal of Food Science, 1998, 63(2):257-261.
Chang et al., "Heat Transfer and Simulated Sterilization of Particulate Solids in a Continously Flowing System", J. Food Sci., 1989, vol. 54(4):1017-1023 & 1030.
Chen et al., "Modeling Coupled Heat and Mass Transfer for Convection Cooking of Chicken Patties", Journal of Food Engineering, 1999, 42:139-146.
Clausing , "Numerical Methods in Heat Transfer", Lectures on Advanced Heat Transfer, 1989, 157-181.
Conway et al., "Commercial Portion-Controlled Foods in Research Studies: How Accurate are Label Weights", Journal of the American Dietetic Association, vol. 104, No. 9, Sep. 2004.
Datta et al., "Computer-Based Retort Control Logic for On-Line Correction of Process Deviations", J. Food Sci., 1986, 51(2):480-483 & 507.
Denys et al., "Evaluation of Process Deviations, Consisting of Drops in Rotational Speed, During Thermal Processing of Foods in Rotary Water Cascading Retorts", J. Food Eng., 1996, 30:327-338.
Dias et al., "Anhydrous Bioethanol Production Using Bioglycerol: Simulaiton of Extractive Distillation Process", European Symposium on Computer-Aided Process Engineering, 2009, 519-524.
Downing et al., "Canning of Marine Products", A Complete Course in Canning and Related Processes, 1996, Book III; 312-322.
EP12164764.8 , "European Search Report", Aug. 16, 2012, 11 pages.
EP12164764.8 , "Office Action", Oct. 8, 2013, 5 pages.
EP12164764.8 , "Response to European Search Report", Apr. 22, 2013, 42 pages.
EP12164764.8 , "Response to Office Action", Feb. 10, 2014, 38 pages.
EP12164859.6 , "European Search Report", Aug. 21, 2012, 5 pages.
EP12164859.6 , "Office Action", Jul. 19, 2013, 3 pages.
EP12164859.6 , "Response to European Search Report", Apr. 22, 2013, 30 pages.
EP12164859.6 , "Response to Office Action", Nov. 7, 2013, 48 pages.
EP12165126.9 , "Communication Pursuant to Rule 71(3)", Jan. 9, 2014, 31 pages.
EP12165126.9 , "European Search Report", Jul. 23, 2012, 8 pages.
EP12165126.9 , "Office Action", Aug. 2, 2013, 4 pages.
EP12165126.9 , "Response to European Search Report", Jun. 19, 2013, 33 pages.
EP12165126.9 , "Response to Office Action", Dec. 9, 2013, 50 pages.
EP12165959.3 , "European Search Report", Jul. 24, 2012, 6 pages.
EP12165959.3 , "Response to European Search Report", Apr. 26, 2013, 39 pages.
EP12167138.2 , "Decision to Grant", Dec. 12, 2013, 2 pages.
EP12167138.2 , "European Search Report", Aug. 17, 2012, 6 pages.
EP12167138.2 , "Response to European Search Report", May 14, 2013, 49 pages.
EP12168270.2 , "European Search Report", Sep. 19, 2012, 4 pages.
EP12168270.2 , "Response to European Search Report", May 21, 2013, 63 pages.
EP12186224.7 , "Communication Under Rule 71(3) Communication", Dec. 19, 2013, 29 pages.
EP12186224.7 , "European Search Report", Dec. 20, 2012, 6 pages.
EP12186224.7 , "Response to European Search Report", Oct. 1, 2013, 34 pages.
Erdogdu et al., "Modeling of Heat Conduction in Elliptical Cross Section: 1 Development and Testing of the Model", Journal of Food Eng., 1998, vol. 38, 223-239.
Fahloul et al., "Measurements and Predictive Modelling of Heat Fluxes in Continuous Baking Ovens", Journal of Food Engineering, 1995, 26:469-479.

(56) References Cited

OTHER PUBLICATIONS

Fastag et al., "Variable Control of a Batch Retort and Process Simulation for Optimization Studies", J. of Food Proces Engg., Nov. 1996, 19:1-14.
Giannoni-Succar et al., "Correction Factor of Deviant Thermal Processes Applied to Packaged Heat Conduction Food", J. Food Sci, 1982, 47(2):642-646.
Gill et al., "Simulation of Ethanol Extractive Distilation with a Glycols Mixture as Entrainer", 2nd Mercosur Congress on Chemical Engineering, 2005.
Gill et al., "Computerized Control Strategies for a Steam Retort", Journal of Food Engineering, 1989, vol. 10 135-154.
Glycerine NPL, "http://www.engineeringtoolbox.com/glycerine-boiling-freezing-points-d_1590. html, 2011".
Hayakawa et al., "Estimating Heat Processes in Canned Foods", Ashrae Journal, Sep. 1975, 36-37.
http://www.artisanind.com/ps/equ, "The Artisan Rototherm", Artisan Industries Inc., Available at least as early as May 8, 2012.
http://www.sciencemadness.org/ta, "(comments by Sauron on pp. 4-5)", Jan. 19, 2007.
Huang et al., "Meatball Cooking-Modeling and Simulation", Journal of Food Engineering, 1995, 24:87-100.
Jiang et al., "Desilication from Illite by Thermochemical Activation", Oct. 2004, vol. 14, No. 5, 1000-1005.
Lanoiselle et al., "Predicting Internal Temperature of Canned Foods During Thermal Processing Using a Linear Recursive Model", J. Food Sci., 1995, 60(4):833-840.
Larkin et al., "Experimental Errors Associated with the Estimation of Thermal Diffusivity from Thermal Process Data", J. Food Sci, 1987, 52(2):419-428.
Liu, "Modelling of Thermal Properties of Food", Handbook of Food Science, Technology and Engineering, 2006, vol. 3 Chapter 110.
Manson, "Evaluating Complex Deviations-Hydrostatic Sterilizers", TechniCAL, Inc., Chapter 12:12-1-12.4.
Manson, "Evaluation of Lethality and Nutrient Retentions of Conduction-Heating Foods in Rectangular Containers", Food Technology, 1970, 24(11):109-113.
Martin et al., "Propylene Glycol Based Heat Transfer Fluids", http://www.engineeringtoolbox.com/propylene-glycol-d_363.html, 2011.
McConnell, "Effect of a Drop in Retort Temperature Upon the Lethality of Processes for Convection Heating Products", Food Tech., Feb. 1952, vol. 6, No. 2, 76-78.
Meng et al., "Heat Transfer to Canned Particulates in High-Viscosity Newtonian Fluids During Agitation Processing", J. Food Processing and Preservation, 2006, 30:643-658.
Morrison et al., "Glycerol", Dec. 4, 2000, 1-13.
Navankasattusas et al., "Monitoring and Controlling Thermal Processes by On-Line Measurement of Accomplished Lethality", Food Technology, Mar. 1978, 79-83.

Porter et al., "Non-Newtonian Viscosity of Polymers", J. Appl. Phys., 1961, vol. 32, No. 11, 2326.
Press et al., "Parabolic Interpolation and Brent's Method in One Dimension", Numerical Recipes in Fortran, 395-398.
Rainbow et al., "Effect of Chelating Agents on Accumulation of Cadmium by the Barnacle Semibalanus Balanoides and Complexation of Soluble Cadmium, Zinc and Copper", Marine Ecology 2, 1980, 143-152.
Sahin et al., "The Thermal Properties of Food", Springer Science, Physical Properties of Food, 2006, 107-155.
Simpson et al., "Computer Control of Batch Retort Process Operations", Food Processing Automation, Conference (Proceedings), May 1990.
Teixeira et al., "Computer Control of Batch Retort Operations with On-Line Correction of Process Deviations", Food Technology, Apr. 1982, 85-90.
Teixeira et al., "Computer Optimization of Nutrient Retention in the Thermal Processing of Conduction-Heated Foods", Food Technology, 1969, vol. 23(845):137-142.
Teixeira, "Innovative Heat Transfer Models: From Research Lab to On-Line Implementation", Food Processing Automation II, Proceedings of the 1992 FPEI Conference, May 4-6, 1992, 177-184.
Teixeira et al., "On-Line Retort Control in Thermal Sterilization of Canned Foods", Food Control, 1997, vol. 8 No. 1:13-20.
Thin-Film Drying, LCI Corporation, Available at least as early as May 8, 2012.
Wang et al., "A Mathematical Model of Simultaneous Heat and Moisture Transfer During Drying of Potato", Journal of Food Engineering, 1995, 24:47-60.
Weng et al., "Process Deviation Analysis of Conduction-Heating Canned Foods Processed in a Hydrostatic Sterilizer Using a Mathematical Model", Journal Food Processing Automation IV, 1995, vol. 41(6):368-379.
Weng et al., "The Use of a Time-Temperature-Integrator in Conjunction with Mathematical Modelling for Determining Liquid/Particle Heat Transfer Coefficients", J. Food Engg., 1992, 16:197-214.
Williams, "Modular Sterilization Processing", Allpax Products, Inc. www.lytron.com/tools-and-technic, "The Best Heat Transfer Fluids for Liquid Cooling", Jul. 14, 2011.
Young et al., "Product Temperature Prediction in Hydrostatic Retorts", Transactions of the ASAE, 1983, vol. 26(1):316-320.
Young et al., "Predicting Product Lethality in Hydrostatic Retorts", Journal of Food Science, 1985, vol. 50:1467-1472.
Zhao et al., "Computer Simulation on Onboard Chilling and Freezing of Albacore Tuna", Journal of Food Science, 1998, vol. 63(5):751-755.
Nelson, "Principles of Aseptic Processing and Packaging", 2010, pp. 3-46, 101-150.

\* cited by examiner

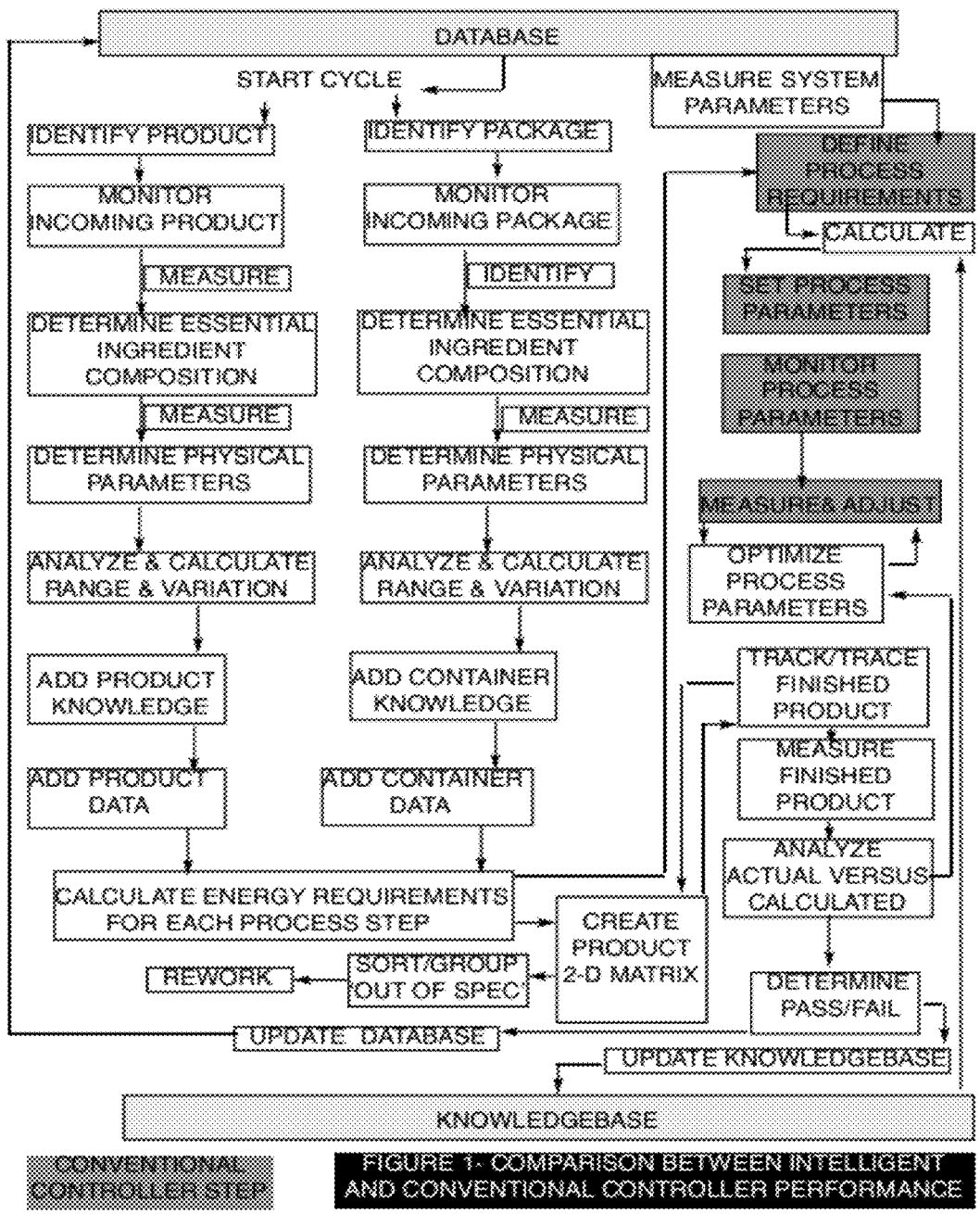
FIGURE 1- COMPARISON BETWEEN INTELLIGENT AND CONVENTIONAL CONTROLLER PERFORMANCE

APPARATUS AND METHOD FOR OPTIMIZING AND CONTROLLING FOOD PROCESSING SYSTEM PERFORMANCE

PRIORITY

This application benefits from the priority of Provisional Patent Application No. 61/478,491, filed 23 Apr. 2011.

Other References Cited

Ball. C O., "Foundation of Food Process Calculation Methods", Sterilization in Food Technology, 124-125 (1992)

Ball, C. O., et al., "Heating Curve-Simple Logarithmic Temperature Rise", in Sterilization in Food Technology, Theory, Practice and Calculations, Chap. 12:313-329.

Bichier, et al., "Thermal processing of canned foods under mechanical agitation", Asme Heat Transfer Div Publ HTD.; American Society of Mechanical Engineers, Heat Transfer in Food Processing, Abstract, 1993.

Chang, S. Y., et al., "Heat Transfer and Simulated Sterilization of Particulate Solids in a Continuously Flowing System", J. Food Sci., vol. 54(4):1017-1023 &1030 (1989).

Chang et al., "Modeling Heat Transfer During Oven Roasting of Unstuffed Turkeys," Journal of Food Science, 63(2): 257-261 (1998).

Chen et al., "Modeling coupled heat and mass transfer for convection cooking of chicken patties," Journal of Food Engineering, 42:139-146 (1999).

Clausing, A. M. "Numerical Methods in Heat Transfer", lectures on advanced heat transfer, 157-181 (1989).

Conway et al., "Commercial portion-controlled foods. How accurate are label weights", (2004)

Datta, A. K., et al., "Computer-based Retort Control Logic for On-Line Correction of Process Deviations", J. Food Sci., 51(2):480-483 & 507 (1986).

Denys, S., et al., "Evaluation of Process Deviations, Consisting of Drops in Rotational Speed, during Thermal Processing of Foods in Rotary Water Cascading Retorts", J. Food Eng., 30:327-338 (1996).

Downing, D. L., "Canning of Marine Products", A Complete Course in Canning and Related Processes, Book III, p. 312-322, CTI Publications, Inc. 5 Baltimore, Md. (1996).

Erdogdu, F., et al., "Modeling of Heat Conduction in Elliptical Cross Section: I. Development and Testing of the Model", Journal of Food Eng., Vol 38, 223-239, (1998).

Fahloul et al., "Measurements and Predictive Modelling of Heat Fluxes in Continuous Baking Ovens," Journal of Food Engineering, 26:469-479 (1995).

Fastag, J., et al., "Variable Control of a Batch Retort and Process Simulation for Optimization Studies", J. of Food Process Engg., 19:1-14 (November 1996).

FMC FoodTech, "NumeriCAL On-Line™ for Batch Retorts . . . " (1997).

FMC FoodTech, "FMC's NumeriCAL™ v.2.09" (1995).

FMC FoodTech, "FMC's NumeriCAL™ Model 101 Software" (1995).

FMC FoodTech, "BatchCAL™ Thermal Processing Software" (1995).

Giannoni-Succar, E. B., et al., "Correction Factor of Deviant Thermal Processes Applied to Packaged Heat Conduction Food", repr. from J. Food Sci., 47(2):642-646 (1982).

Gill, T. A., et al., Computerized Control Strategies for a Steam Retort , Journal of Food Engineering, vol. 10, 1989, pps. 135-154.

Hayakawa, K., "Estimating Heat Processes in Canned Foods", Ashrae Journal, 17(9):36-37 (September 1975); Author corrects errors, Food Technol., 29(2):70 (1975).

Huang et al., "Meatball Cooking-Modeling and Simulation," Journal of Food Engineering, 24:87-100 (1995).

Lanoiselle, J.-L., et al., "Predicting Internal Temperature of Canned Foods During Thermal Processing using a Linear Recursive Model", 1 Food Sci., 60(4):833-840 (1995).

Larkin, J. W., et al., "Experimental Errors Associated with the Estimation of Thermal Diffusivity from Thermal Process Data", J. Food Sci., 52(2):419-428 (1987).

Liu, S. X. Modelling the thermal properties of food, Chapter 110-2 in 'Handbook of Food Science, Technology and Engineering, Vol 3, ed Hui Y. H. 2006

McConnell, J. E. W., "Effect of a Drop in Retort. Temperature Upon the Lethality of Processes for Convection Heating Products", Food Tech., 76-78 (February 1952).

Manson, J. E., "Evaluating Complex Deviations-Hydrostatic Sterilizers", TechniCAL, Inc., Chap. 12: 12.1-12.4.

Manson, J. E., "Evaluation of Lethality and Nutrient Retentions of Conduction-Heating Foods in Rectangular Containers", Food Technology, 24(11):109-113 (1970).

Navankasattusas, S., et al., "Monitoring and Controlling Thermal Processes by On-Line Measurement of Accomplished Lethality", Food Technology, 79-83 (March 1978).

Press, W. H., et al. "Parabolic Interpolation and Brent's Method in One Dimension", Chap. 10.2, Minimization or Maximization of Functions, 395-398.

Sahin S and Sumnu, S. G. The thermal properties of food, Chapter 3 in 'Physical Properties of Food, ed. Sahin S and Sumnu, S. G., Springer Science, 2006

Simpson, R., et al., "Computer Control of Batch Retort Process Operations", Food Processing Automation Conference (Proceedings), FPEI, ASAE, Lexington, Key., (May 1991)

Teixeira, A. A., et al. "Computer Control of Batch Retort Operations with On-Line Correction of Process Deviations", Food Technology, 85-90 (April 1982).

Teixeira, A. A., et al., "Computer Optimization of Nutrient Retention in the Thermal Processing of Conduction-Heated Foods", Food Techology, vol. 23(845):137-142 (1969).

Teixeira, A. A., "Innovative Heat Transfer Models: From Research Lab to On-Line Implementation", Food Processing Automation II, proceedings of the 1992 FPEI Conference, 177-184 (May 4-6, 1992).

Teixeira, A. A., et al., "On-line retort control in thermal sterilization of canned foods", Food Control, vol. 8, No. 1. 1997, pp 13-20.

Wang et at, "A Mathematical Model of Simultaneous Heat and Moisture Transfer during Drying of Potato," Journal of Food Engineering, 24:47-60 (1995).

Weng, Z., et al., "Computer Control of a Hydrostatic Sterilizer with On-Line Correction of Process Deviations", IFT 1986 presentation slides abstract (1986).

Weng, Z., et al., "The Use of a Time-Temperature-Integrator in Conjunction with Mathematical Modelling for Determining Liquid/Particle Heat Transfer Coefficients", J. Food Engg., 16:197-214 (1992).

Weng. Z., et al., "Process Deviation Analysis of Conduction-Heating Canned Foods Processed in a Hydrostatic Sterilizer Using a Mathematical Model", Journal Food Processing Automation IV, vol. 41(6):368-379 (1995).

Weng, Z. et al., "Computer Control of a Hydrostatic with On-Line Correction of Process Deviations", Institute of Food Technologists, (Annual Meeting 1996), XP000892917 Chicago, US abstract.

Weng, Z., et at, "Computer Control of a Hydrostatic Sterilizer Operations with On-Line Correction of Process Deviations", Presentation Slides, IFT '96, New Orleans, Jim. 23, 1996. Young, K. E., et al., 'Predicting Product Lethality in Hydrostatic Retorts', vol. 50:1467-1472 (1985).

Young, K. E., et al., "Product Temperature Prediction in Hydrostatic Retorts", Transactions of the ASAE, vol. 26(1):316-320 (1983).

Zhao, Y. et al., "Computer Simulation on Onboard Chilling and Freezing of Albacore Tuna", Journal of Food Science, vol. 63(5): 751-755, (1998).

FIELD OF INVENTION

The present invention relates substantially to the control of continuous cooking and cooling of food and drink products to either pasteurization or sterilization or enzyme stabilization temperatures. It also relates to a controllable mechanism for improving the cooking and cooling times, product quality and organoleptic properties of such products, more especially minimizing the variability of the products so processed. It further relates to the methods of monitoring and measurement of process and product properties, essential to enable such controller to affect any necessary controlling actions to said systems.

BACKGROUND OF THE INVENTION

There are three main processes for the large-scale processing of food. Aseptic processing heats essentially fluid food and drink products to a suitable pasteurization temperature and then deposits them into suitably sterilized containers within an essentially aseptic environment.

Retorting uses the combination of heat and pressure to pasteurize or sterilize a food product essentially sealed within its container. The most common form of retorting is batch retorting where fixed quantities (by weight, size or volume) of product are processed under essentially identical process conditions within a static, usually single, processing vessel. A more recent variant, continuous retorting, moves batches of product through a series of vessels or chambers, each having as a series of set processing parameters.

Hydrostatic sterilizers undertake a similar process to continuous retorting but the product is passively moved through a static processing system comprised of several towers or chambers, each having a specific set of processing parameters which in combination achieve the necessary sterilization of the product and its container. Unlike retorting, the product moves individually and continuously through the chambers, not in batches.

There are many variants of these general processes such as the different methods of moving the product through the system, e.g. using product carriers attached to chain drives as in the Stork™ Hydrostat® or a helical rotation of the product through a processing vessel as in the FMC continuous Rotary® system.

While such processing systems are generally applied to larger-volume product requiring sterilization or pasteurization, many other products only require to be stabilized for improved shelf-life. Such treatment usually requires the inactivation of product components such as enzymes, oxidants or spoilage micro-organisms, which, if left untreated, would eventually lead to product spoilage. Typical examples are fresh fruits and vegetables to be converted to a form suitable for frozen or refrigerated storage, or processed products, such as ready meals, for chilled storage.

However, no matter which process is used or which products the process treats, to achieve the necessary processing state, i.e. sterilized, pasteurized or stabilized, the product must be subjected to a defined time-temperature-pressure treatment sufficient to ensure that every part of the product receives, at least, the minimum amount of energy to achieve a necessary minimum level of total micro-organism and/or enzyme lethality. Total lethality targets are usually defined by the appropriate regulatory bodies such as USDA and FDA in the USA and Food Standards Authorities in the European Union.

During any processing operation, there is almost always one location within the food container that for physical, and/or chemical and/or biochemical reasons is the last to reach the required temperature and therefore the last to be effectively processed. This is usually defined as the product 'cold spot'. The Lethality target is directed at this location as it is assumed that this location is, from a product safety perspective, the least safe within the product. However, there are several obvious problems with such an assumption.

Firstly, it assumes that the product within the container displays minimal variation with regard to process performance. It is well-known, not only to those skilled in the art, but also anyone who has been involved with almost any aspect of food and drink product manufacture that there is tremendous variation in the composition and physical properties of the same item, even when produced ostensively from identical raw materials under similar conditions. The greater the complexity of the product, the greater the potential for such variation. Liquid-only products show the smallest variation, multiple component solid/liquid products show the greatest.

Such variation is acknowledged by food regulatory authorities and flexibility within labeling regulations reflect this. Products labels have to show a total composition, with its total composition broken down to a % content of major components such as protein, fat, carbohydrate, etc. In many instances, while major components such as meat in meat products and sugar content in jams, etc., have to show a % content, the figures quoted only need to be 'typical averages'. Additionally, the regulations allow 20%-25% overstatement of protein content and a similar understatement in fat, sugar and moisture content. While this variability has a significant effect on nutritional quality, it can have a major influence on heat transfer properties, and thus product processing requirements.

A further basic labeling requirement is the statement of 'net weight', i.e. the weight of product after the product container is accounted for. Manufacturers generally overcome variations in weight by adopting a 'minimum weight' or a deliberate 'giveaway' approach, whereby only underweight product/container combinations are ejected. A recent study by Conway et al (2004) showed that more than 60% of a large sample of food items were out of compliance with their stated label contents and more than 15% were significantly out of compliance with their stated total weights. Both sources of variation can have a significant effect on processing performance, particularly the minimum lethal heat requirement and thus the safety of the processed food.

Secondly, in designing a processing methodology, it is also assumed that all parts of the process perform with equal and reproducible performance. It also known by those skilled in the art that few if any food processing systems have homogeneity of performance either within or between batches of product or between or within process segments.

Between batches variation can be due to a range of conditions including, but not limited to, product storage temperature and/or length of storage time prior to processing, product processing conditions, especially temperature range and variation, raw material compositional variation, raw material physical and chemical property variation, product weights, container weights, variation in dead-space volume, container compositional variation, especially liquid to solid ratio, stacking and packing configuration variation between batches, product temperature entering the processing system, product temperature leaving the processing system, storage time-temperature conditions following processing, etc. Additional variability in external, environmental and within process conditions will also contribute to between batch variability.

Variations within batch variation can be due to a range of conditions including, but not limited to all those previously described for between batch variation but also variation in processing conditions within the process system. Because few, if any of these variations will show up in conventional process monitoring, providing the input energy availability meets minimum requirements, there is often little indication that anything is wrong with the finished product as the process appears to be functioning as predicted and anticipated.

Thirdly, in addition to the variability of system performance, product composition and homogeneity, there is the rate of energy transfer and the variability of that energy transfer rate. We have shown (U.S. Patent Application 61/488,220, hereinafter incorporated by reference) that many physical factors affect the rate at which thermal energy is transferred from an outside energy source into the container while different factors affect the rate at which this thermal energy is transferred through the foodstuff and between the individual components comprising the foodstuff. We have also shown that various actions can be taken before, during and after processing which will both enhance the rate of transfer and improve the uniformity of its distribution.

Similarly, we have also shown (U.S. Patent Application 61/478,190, hereinafter incorporated by reference) that applying a range of physical actions to the container before, during and after processing can also enhance the efficiency of thermal transfer and its uniformity of distribution.

A typical example of how a process controller for a continuous Hydrostatic system measures, monitors and controls the process is described in U.S. Pat. No. 6,440,361 to Weng who also details many of the advances and variants of finite element analysis models that are used to produce predictive processing algorithms.

In summary, this and virtually all such similar programs rely on sensor measurement of water temperatures at various locations within the processing system, water levels, conveyor speeds, etc. Weng also states that the predictive process temperature profile is based on a measurement of the initial product temperature. Unfortunately, he does not disclose how that can be achieved, especially if the product is already in a sealed container such as a can, jar or bottle. Nor does he mention how variations of initial product temperature within a batch can be identified or measured or can be accommodated within a continuous processing program. In all process controllers based on predictive processing algorithms, actual measurements are compared with the predictive program measurements and deviations identified.

Within a continuous sterilization system, there is very little opportunity to modify any of the processing parameters with the exception of dwell time. In practice, any under-processed containers can only be assured sufficient processing if the faulty product is identified before or within the sterilization chamber/tower as this is the only part of the process that actually reaches sterilization temperatures. If not identified in time then all product prior to and up to the point of identification has to considered suspect and either ejected or reprocessed which significantly enhances the likelihood of excessive over-processing and thus poorer quality. It also adds considerable additional cost.

Similarly, if under-processed product is identified in time and the conveyor speeds adjusted to ensure sufficient dwell time then because of the volumes of product these continuous systems process (often 400-600 units per minute), a very significant volume of 'normally processed' product will also become significantly over-processed.

All of the foregoing clearly show that current process controllers rely almost exclusively on the measurement and control of the processing parameters of the system and identify only when processing conditions actually or are likely to fail to meet minimum processing requirements. None measure any product variation in individual containers nor variations in energy transfer and none are able to modify processing conditions without over-processing 'normal' product. While such predictive process control algorithms ensure all product meets minimal sterilization requirements, it can only be done at the expense of significantly over-processing the majority of product.

We have found that it is impossible to both control product quality and achieve the most time-, quality- and cost-effective product processing without measuring and monitoring physical and chemical product variation on an individual container basis.

The technology and methods detailed in this patent application provide a unique and novel approach to resolving most, if not all such issues and problems and we will now detail the individual embodiments that comprise the solutions.

SUMMARY OF THE INVENTION

Definitions

In addition to specific definitions described elsewhere within this application, for the purpose of clarity the following additional definitions are made 'Dynamic' describes the manner in which the process controller, system database and system knowledgebase automatically update themselves once new data has been validated.

'Pro-active' relates to the manner in which the controller program evaluates performance, i.e. it reacts as a consequence of analyzing the data and information it receives rather than waiting until the process has been completed and program modifications made—this is generally defined as 'Reactive'.

It is an object of the present invention to provide an apparatus and method for defining the heating, holding and cooling times of a foodstuff in an essentially fluid or fluid/gaseous medium.

It is an object of the present invention to provide an apparatus and method for controlling the heating, holding and cooling times of a foodstuff in an essentially fluid or fluid/gaseous medium.

It is another object of the present invention to provide an apparatus and method to implement such process definition and control so as to reduce the total heating, holding and cooling time of a foodstuff in a controlled and predictable manner in an essentially fluid or fluid/gaseous medium.

It is a further object of the present invention to define the form, function and control of the processing system controller so that the individual effects of heating, holding and cooling the product and its components, its container and the processing system, in whole or in part, can be derived and optimized through the monitoring and measurement of its component parts and any variations or changes that may occur.

It is a further aspect of this invention that such degree of control of the process and its optimization can be applied to each individual unit of production.

It is another object to provide an apparatus and method to improve the quality of such processed foodstuff in a reproducible manner.

It is yet another object to provide an apparatus and method to increase the throughput capacity of the processing system.

It is a further object of the present invention to provide an apparatus and method that will allow the definition and control of the processing conditions for a wide variety of foodstuffs to be optimized and/or implemented while being processed within the same system.

It is also an object of the invention to allow the apparatus and method to be designed in a flexible manner so as to be applicable for foodstuffs requiring to be thermally processed to achieve at least one of the following product states, namely product stabilization, enzyme inactivation, pasteurization or sterilization.

It is a further aspect of the invention that all of the above stated objects of the invention can be used individually or in any combination within any suitable continuous, batch or individual cooking and/or cooling processing system.

It is a final aspect of the invention that the process controller controls the process and the performance and quality of the resultant product in a pro-active and preventative way rather than the reactive approach used by existing process controllers.

BRIEF DESCRIPTION OF DRAWINGS

FIG. 1 A flow diagram illustrating the differences between the decision-making and process optimization of a conventional process controller and the novel controller described herein.

DETAILED DESCRIPTION OF THE INVENTION AND PREFERRED EMBODIMENTS

We will now describe the preferred embodiments of the present invention in more detail. However, it will be obvious to anyone skilled in the art that the technology and methodology described in this application can be applied to monitoring, measuring and optimally controlling the heating and cooling processing treatment of many different types of product including but not limited to sterilization, pasteurization, product stabilization, enhanced shelf-life based on enzyme inactivation, conversion of product state and similar approaches. Consequently, the detail and examples described within this application are purely illustrative of the approach adopted and not meant to be limiting as to the range and scope of the application.

We will first detail the effect and changes of the principle physical, chemical and biochemical properties of the product constituents on the conventional predictive performance algorithms and the overall effect and variability of performance of a continuous processing system.

We will then detail the technology and/or methodology developed to measure, monitor and control these principle effects. And finally we will detail how the process controller manages and controls all the necessary events together with a number of related examples. We will also compare the performance of the innovative controller and related methodology with conventional/existing process control technology.

There is a major difference between the controller and its application as detailed in this patent compared with conventional process controllers. This novel controller is both pro-active and functions in 'real-time' compared with the reactive, non real-time approach of conventional process controllers.

Therefore in a preferred embodiment, the process controller is pro-active, i.e. through monitoring and measurement it is able to modify processing conditions to accommodate the variability of the incoming materials. It is also able to identify and eject any product that would not be sufficiently processed to meet minimal processing requirements. Similarly, it can identify product that would be over-processed by the prevailing process conditions.

In a further embodiment, the controller can undertake all such pro-active activities and actions in 'real-time', i.e. the actual performance of the product can be calculated before the individual product container enters the processing system and therefore acceptability of performance can be validated.

There are a number of major food groups that make up the composition of a food product, these are proteins, fats, carbohydrates, solids/ash together with water, air and/or ice. Each of these ingredient groups has a different rate of thermal transfer. In thermal processing, the fastest thermal transfer is through ice (some 4 times faster than through water) but this is rarely encountered in a sterilization environment. The extremes of thermal transfer are air and water where the rate through air being $1/10^{th}$ of that through water. The other major ingredient groups have thermal transfer rates that are between 50%-70% less than water.

However that is only part of any equation. The rate of heat transfer also varies with the physical status of the component within the product. For example as the temperature of animal fat increases, its density decreases; it also begins to change state from a solid to a gel-like liquid and eventually to a liquid. As this occurs, the rate of heat transfer increases. Oils of vegetable derivation change in viscosity and rate of thermal transfer but to a much lower degree than animal fats. While this has relatively small effects during any heating phase, it can have a major influence during cooling phases when the rate of heat transfer can be as much as 4 times slower through fat components at low temperatures.

Similarly, water content and/or water activity of the individual components can display similar effects. Soluble carbohydrates in the form of simple sugars transfer energy at a significantly different rate to that of complex insoluble starches so making it very easy to over-process or even denature these solids compared with the semi-solids or solutions of sugars, such as high fructose corn syrup.

Finally, there are those components that actually change state during processing so that during the heating phase they exhibit one set of physical and thermal transfer properties and during the cooling phase exhibit another. These effects are well demonstrated by animal proteins such as meat proteins.

During the heating cycle, the structure of both muscle proteins and connective tissue changes as each is subjected to a change of state. The structure of some of the muscle proteins initially ruptures releasing soluble protein into the protein mix, some of the structure unravels due to thermal denaturation of some of the connective tissue into soluble gelatin. This has two effects, firstly the structures become less dense and rate of heat transfer changes. However, other proteins denature and this percentage increases relative to several physical processing conditions such as rising temperature, length of exposure but also the temperature at the interface, e.g. the temperature of the can surface in contact with the meat protein.

In addition, particle size, particle distribution and the liquid to solid ratio of, constituents will also have an effect on the rate of thermal transfer.

Conventional process controllers cannot measure nor monitor any of these effects, nor are they able to modify process control conditions. In order to develop a process control program, a product will be heated and cooled in a laboratory environment in a process which emulates the commercial manufacturing process and where the temperature of both the energy source and the product will be monitored through instrumentation and a temperature profile developed on a trial and error basis. In the more technologically advanced systems, the power consumption may also be monitored. In this way, the cold spot for the product will be identified and a suitable thermal process and control program based on a predictive performance algorithm will be developed.

It will be obvious to anyone skilled in the art that unless any change in processing conditions is sufficiently severe, more subtle changes such as those detailed above can neither be measured nor controlled by a conventional process controller and certainly not on an individual container basis.

We have found that the greater the quantitative knowledge we accumulate about the product and the container the better we can generate accurate and effective processing control programs. However, we have surprisingly found that despite the potential complexity of interactions and reactions, we need relatively few data parameters to both optimize the processing system and identify potentially problematic product.

For example, if we have knowledge of compositional variation of the product in each container, we can identify those containers of product likely to perform outside the required criteria for safe processing. In a preferred embodiment, we measure the essential components for each product and the variation of the components of that product for each container to be processed. The measurements can be made at any suitable locations up to the point that the container is closed or processing begins.

Those skilled in the art will appreciate that the technology and methodologies used to achieve this will vary according to the product type. For example, for a liquid product such as fruit juice, the important criteria are total product volume, total product weight, headspace volume and liquid to solid ratio and distribution. For a solid product such as beans in a sauce, the same criteria are needed together with a measurement of any entrained air.

For a mixed liquid/solid product such as meat in gravy or vegetable noodle soup, while the solid to liquid ratio is of major importance, the distribution and ratio of the components is more important. As previously stated, different components transfer thermal energy at different rates: with vegetables conducting at a rate up to twice that of fatty meat, any significant imbalance in vegetable to meat ratio will also affect the rate of heating and cooling.

There are many technologies available to obtain the necessary data and quantitative measurements. For example, Newman (GB 2285126) teaches that fat and protein content of meat can be determined using a combination of X-ray and image analysis, adding UV illumination allows connective tissue to be measured. Contents level, density and density distribution can also be measured using X-ray processing. Product temperature can be measured through IR while water content can be measured by multiple wavelength IR reflectance. Weight can measured by load cell or calculated from a combination of X-ray and IR measurements. Product composition can also be measured with ultrasound and/or velocity of ultrasound. However we have found that non-contact technologies such as X-Ray, Image Analysis and IR are preferable, especially in high volume/high speed environments such as a continuous sterilizer that can be producing/processing product in excess of 400 units per minute.

In a preferred embodiment, food components, if possible, are measured for composition and variability by any suitable method at any suitable point prior to package sealing. This approach allows for some degree of data validation after each container is filled. It also allows for improved food safety and wholesomeness such as scanning of components for physical contamination such as glass, metal, stone or selected plastics.

We have been able to develop highly accurate and sensitive predictive algorithms based on principle component and other suitable analyses. In a further embodiment, we can calculate the product performance at the individual container level and we can identify potentially suspect product, prior to processing, down to an individual container level.

We have been able to further enhance the accuracy and optimal performance of the process controller by further developing the data capture and knowledge base of each product and each container type. Knowledge of the container material, the container dimensions, the residual air volume/headspace and calculating a number of other parameters including the surface area to volume ratio, will allow prediction not only of the actual thermal performance of each container of product, but pro-active calculation of what process changes are needed to optimize the processing conditions.

Therefore, in a further embodiment, we measure the relevant properties of the individual product containers and product mixture and calculate the projected thermal transfer performance for each container type and each individual container/product mixture.

Newman (U.S. Pat. No. 6,148,249) discloses a method of collecting and compressing the product compositional information and embedding it in a 2D-Matrix. This is applied to the product and/or the product container together with or incorporating a unique package identifier. Newman (U.S. Patent Applications 61/182,696 and 61/079,185) also teach methods of applying the process information to the product using a similar 2D matrix approach.

In a further embodiment, and incorporating Newman herein by reference, we have combined the matrices so that each product container carries compositional information, processing requirements and a unique identifier. In addition to ensuring that correct product goes to the correct process, it can also be used to reject product which processing algorithms deem unlikely to receive adequate or safe product processing or likely to be over-processed.

In yet a further embodiment, the actual processing conditions each container has received, can be applied to each product container after processing, thus allowing each container to be 'interrogated' at any suitable location, e.g. at final packaging to ensure minimal safe or adequate processing has occurred. It also allows for a continuous uninterrupted tracking and tracing of product from raw ingredients to final end user and a history of its processing.

In another embodiment to this application, in combination with Newman (U.S. Patent Application 61/488,220) and Newman (U.S. Patent Application 61/478,190), we have found that we can calculate the additional effects of improved product orientation and agitation as well as optimized package configuration and material selection. Adding this information to product and packaging predictive performance algorithms allows us to include two further steps to optimize processing conditions, product quality and reduced variability, namely individual container sorting prior to processing and modified placement/sorting of individual containers prior to processing for optimal processing performance.

Conventional process controllers assume that in a continuous process sterilization system, providing the actual process conditions exceed predicted minima, product will be processed adequately and meet minimal processing requirements. We have proven that this is an inaccurate assumption due to the interaction of all the product, container and process properties previously detailed but, more specifically, due to excessive parameter variability.

We have shown that, particularly in static conditions, i.e. a batch retort or a continuous sterilizer in which product has minimal to nil agitation, the rate of energy transfer in any can is additionally influenced by container location. For example, where product is stacked, the rate of heating and cooling of a container of product on the outside of a stack is quite different to a container embedded deep into the stack. Similarly, where product is stacked in a 'stick formation', i.e. a number of cans are stacked end-to-end horizontally, the cans at the end of the stick will have more surface area exposed to the energy source and have less carrier structure interfering with energy transfer than cans in either the middle of the stick and/or the middle of the carrier.

In a further embodiment, the additional effects of agitation and location relative to product composition, product component distribution and container performance are calculated. Such additional measurements are used to optimize individual container location within a stack, carrier or other treatment location through sortation.

Finally, and because each container of product has a unique identifier, we know precisely where in the process the container was located. This gives us the ability to continually relate each actual product, container and process parameter in isolation and combination to each predicted value in any performance or process algorithm. Such measurements and data can be any combination of direct or indirect, 'real-time' or time stamped. This allows the system to continuously and automatically 'fine-tune' its performance for each product/container combination.

Therefore, as a final embodiment to the patent, the process controller continuously and automatically compares and optimizes its own performance without the need for operator interaction.

We will now describe a number of examples that illustrate many of the individual embodiments and interactions of this patent application resulting in the invention of an intelligent, pro-active, automatic process controller for batch or continuous product processing.

EXAMPLES

The following examples serve only to illustrate the general application and methodology of this invention. It will be obvious to anyone skilled in the art that each and every step/stage can be modified and as a consequence the possible permutations are almost infinite. Indeed and because the controller is product-driven as the product changes, the process requirements of each step will also modify. The examples quoted illustrate how the major elements and the components of those elements interact to change the overall requirements of the processing system to achieve the necessary thermal processing conditions while optimizing the whole process and maximizing product quality.

Example 1

Defining the Essential Compositional Elements of a New Product

The first step requires a theoretical/practical definition of the product composition as well as compositional variation likely to be encountered. This usually starts as a recipe with fixed component weights. Each component is then analyzed for protein, fat, moisture, carbohydrate and ash/insolubles. The sum of the individual components together with any added water will provide the total composition. This is essential for calculating the thermal conductivity properties for the product. Once defined the product recipe and compositional information can be stored in the product controller database.

Example 2

Defining the Physical Properties of a New Product

Before the heating and cooling steps can be calculated, the physical characteristics also need definition. Data on particle size, particle size variation, solid to liquid ratio, total product weight, etc., need to be measured and analyzed. From this information and the compositional information derived from Example 1, it is now possible to calculate the energy requirements for the product. Depending on composition, component distribution, physical attributes of the components and other specific properties, any of energy requirements can be modified. For example, if the product contains meat then the particle size (meat chunks or ground meat or dice) will affect the rate of heating of cooling. If any of the pieces contain significant amounts of fat then that may influence rates of cooling to a greater extent than heating.

Example 3

Defining the Package Properties of a New Product

In addition to the definition of the product composition and its physical properties, the physical attributes of the package will play an equally important role in quantifying the required processing conditions. The package material composition, its dimensions, its surface area relative to product volume, its thickness when filled, its air/gas volume when sealed, etc., will all influence not only the rate at which the thermal energy will pass through it into the product, but also the amount of total energy it will consume and the rate of that consumption.

Each attribute will play a major role in the rate of heating and cooling and the overall process efficiency. For example, surface area to product volume will primarily influence the total heating and cooling times while the air/gas volume remaining in the package will reduce overall processing efficiency particularly if the package remains static during processing.

Example 4

Defining Process Modifying Conditions

As previously described, there are a number of attributes of the process that will accelerate or retard both the rate of thermal transfer and its optimization. We will detail three here.

If there is a large headspace, then the rate of energy transfer through the air/gas will be almost exclusively by convection which is considerably slower and less efficient than the rate of energy transfer by conduction which is what will happen with that part of the container that holds the product contents. If there is no or minimal movement of the product container during processing then the process conditions need to be modified to allow for this slower heating/cooling zone.

On the other hand, if there is a substantial solid component to the product then with the rate of thermal transfer of water being almost 3 times faster than protein, carbohydrate or fat containing solids, if there is no or minimal product movement during processing, the process conditions again need to be modified to compensate for this asymmetry in thermal transfer.

A further processing condition issue is the relationship between the total amount of energy available between the energy source and the container surface as well as between the container surface and the product contents. Ideally, the total amount of available energy needs to be as close to the rate at which it can be conducted/convected across the interface. If this balance is not achieved then there are two potential consequences.

If the total amount of heating or cooling at the container interface exceeds the ability to transfer it to the product contents then the temperature of the product closest to the container surface will rise or fall considerably faster than that present within the container. This will result in substantial overcooking compared with the internal contents.

If the energy can be transferred to the product faster than the total amount at the process/container interface then while the rate of heating will be more even, it will be far from optimum. The processing conditions will again need to be modified to compensate.

As detailed elsewhere in this application (and US Patent Application 61/488,220), introducing 1-, 2- or 3-dimensional motion to the container and/or the product during processing will significantly improve the efficiency of energy transfer by maximizing the $\Delta T$, i.e. the temperature gradient between the energy source and the product contents while minimizing the temperature gradient within the product.

Example 5

Measuring and Monitoring Product and Process Changes

Current and previous process controllers for pasteurizing or sterilizing foodstuffs have relied on monitoring essential process condition parameters and comparing these values with predicted values to determine whether a process is proceeding as anticipated. Additionally, it is possible to use heat resistant data loggers to develop an historic time-temperature profile for comparing actual temperatures and pressures with predicted values. With the exception of experimental conditions, it is virtually impossible to measure or monitor 'real-time' product conditions.

However, such 'real-time' data is likely to be of little practical value as changing the processing conditions in real-time is virtually impossible because of the huge energy and mass transfers involved. The only reactive option for a continuous sterilizer is to slow down or speed up the product throughput and this would result in substantial volumes of product being under or over-processed.

The method of control detailed in this invention is continuously pro-active rather than reactive. This is achieved by monitoring all those dynamic product and container parameters that could influence processing time, processing efficiency and/or product quality. Additionally, processing parameters such as pressure, temperature, water/steam levels, are also monitored.

We will now give two examples of how measuring and monitoring product will control/induce changes to the process. We will use a liquid product with fine particulates (orange juice) and a solid/liquid product such as meat chunks in gravy.

For the liquid product, to be able to predict process performance, we need to establish volume of container and product, solid to liquid ratio, head-space volume/content, etc.

We do not need to measure particulate content, we can estimate particulate content by volume, weight and specific gravity. As we already know the container size and shape parameters all required measurements can be calculated or measured. Volume can be measured by any suitable method including IR, X-Ray, Image Analysis or metered addition The measured data is compared with the product, container and process controller predictive algorithms for the product and the permissible maxima and minima for each required component. It is therefore easy to monitor every container prior to entering the processor and reject those that would be under or over processed. Further refinement would allow predicted under-processed product to be rejected down one line and over-processed down a separate line. These can then be processed later without loss.

For the solid/liquid product, the solid component, the meat needs to be accurately determined not just weight but also fat/lean content. Small amounts of fat will have minimal effect on energy transfer or processing time. However, because fat and lean have very different specific densities and energy transfer, large variations in meat composition will significantly affect processing time.

Meat composition, particularly fat, lean and connective tissue content can easily be measured using X-Ray or X-Ray in combination with image analysis. Moisture content can be measured directly using IR techniques or in combination with weight. The advantage of all these measurement techniques is that they can all measured in real time, in a commercial environment without need for contact (Newman GB 2285126).

As with the liquid product, the measured data is compared with the product, container and process controller predictive algorithms for that product and the established permissible maxima and minima for each required component. The optimized product handling and processing conditions are calculated and defined and the process controller presets, monitors and controls the necessary processing parameters.

Example 6

Track and Trace by Unit Identification

All of the previous examples identify and illustrate how specific components, elements or aspects of the product, container and/or process affect the product and/or product conditions. They also show how quantifying and/or modifying each or any of these effects or attributes will change one or more of the parameters that control process efficiency.

The essential and common element to all of these aspects is the ability to identify individual units of product, i.e. individual containers and to be able to track the components that comprise the product formulation.

There are many different formats such data identification can take. However, we have found that a 2-dimensional bar code can be used to not only provide each container with a unique and traceable identifier but also allows for product, product composition, container composition, positional information and process conditions to also be added to and/or carried with the product.

This also allows for the individual product containers to be inspected after processing so that required process performance can be compared with the actual process performance achieved allow for confirmation and verification of effective processing on an individual basis.

The invention claimed is:

1. A method of processing individual foodstuff units comprising foodstuff and a product container for containing the foodstuff, the process comprising heating and cooling steps, by monitoring and quantifying product performance for each individual foodstuff unit, comprising the steps of:
   identifying and measuring the composition of the foodstuff of each foodstuff unit prior to entering the foodstuff process,
   measuring physical, chemical, and/or biochemical properties of the foodstuff of each foodstuff unit prior to entering the foodstuff process,
   calculating thermal energy requirements of the foodstuff of each foodstuff unit prior to entering the foodstuff process,
   prior to initiation of foodstuff processing, identifying the product container containing the foodstuff for which identifying the composition of the foodstuff of the foodstuff unit has occurred and for which the measuring of physical, chemical, and/or biochemical properties of the foodstuff of the foodstuff unit has occurred,
   prior to initiation of foodstuff processing, analyzing the properties and the thermal energy requirements of the foodstuff of the foodstuff unit to calculate thermal processing requirements for the processing steps of the foodstuff process,
   defining process conditions for the processing steps of the foodstuff unit prior to initiation of foodstuff processing to achieve, maintain, and control the calculated thermal processing requirements of the foodstuff unit that generate a level of product quality that seeks to neither over-process nor under-process the foodstuff of each foodstuff unit,
   monitoring the thermal processing performance for each foodstuff unit on an individual basis, entering the foodstuff process by:
      applying an identifier to each product container corresponding to a foodstuff unit prior to entering the foodstuff process,
      measuring the process conditions associated with the processing steps of each foodstuff unit,
      analyzing the measured actual values of physical, chemical, and/or biochemical properties for the foodstuff of the foodstuff unit and the process conditions associated with the processing steps to determine the actual thermal processing performance achieved for the foodstuff of each foodstuff unit, and
      comparing the calculated thermal processing requirements with the actual thermal processing performance achieved for each foodstuff unit.

2. The method according to claim 1, wherein the process control program is generated primarily through continuously monitoring and measuring the product properties and the thermal processing performance.

3. The method according to claim 1, wherein the foodstuff process is a sterilizing or pasteurizing or stabilization process.

4. The method according to claim 1, wherein the foodstuff can be any liquid, solid, or liquid/solid combination of components suitable for human and/or animal consumption.

5. The method according to claim 1, wherein the process conditions are calculated and optimized around the composition and properties of the foodstuff.

6. The method according to claim 1, wherein the identifier applied to each product container contains a unique identifier which holds the actual measured values of the physical, chemical, and/or biochemical properties for the foodstuff and the measured process conditions.

7. The method according to claim 1, wherein the physical, chemical, and/or biochemical properties for the foodstuff are known or can be measured and quantified prior to the sealing of the container.

8. The method according to claim 1, wherein the process control program continuously generates data and knowledge of each foodstuff unit and any associated optimized process conditions.

9. The method according to claim 1, further comprising modifying the defined process conditions within the process control program to incorporate any additional physical and/or chemical process steps identified so as to optimize the defined process conditions.

10. The method according to claim 1, wherein any individual foodstuff unit that has been under-processed or over-processed can be individually identified.

11. The method according to claim 1, wherein each step of the foodstuff process can be used to individually optimize the defined process conditions.

12. The method according to claim 9, wherein the additional physical and/or chemical processing steps that are identified so as to optimize the defined process conditions within the process control program for each individual foodstuff unit are known.

13. The method according to claim 1, further comprising:
   identifying product containers that have been under-processed or over-processed; and
   ejecting such under-processed or over-processed foodstuff units from the foodstuff process.

14. The method according to claim 1, further comprising retaining captured, generated, and calculated information, data, and knowledge for reference.

15. The method according to claim 14, wherein the captured, generated, or calculated data is retained for reference in a database.

16. The method according to claim 14, wherein the captured, generated, or calculated knowledge is retained for reference in a knowledgebase.

17. The method according to claim 14, wherein the captured, generated, or calculated data is retained for reference in a database; the captured, generated, or calculated knowledge is retained for reference in a knowledgebase; and the database and the knowledgebase automatically update themselves once new data and/or new knowledge has been validated.

18. The method according to claim 1, further comprising:
   measuring the physical and/or chemical properties of the product container;
   calculating the thermal energy requirements of the product container;
   analyzing the properties and thermal energy requirements of the product container for use in calculating the thermal processing requirements for each processing step within the foodstuff process;
   monitoring the thermal processing performance for each foodstuff unit; and
   on completion of the process control program, comparing the calculated thermal processing requirements with the actual thermal processing performance achieved for each foodstuff unit.

19. The method according to claim 18, wherein the monitoring of the thermal processing performance for each foodstuff unit entering the foodstuff process is carried out by:
   measuring the process conditions associated with each processing step of the foodstuff unit; and
   analyzing the measured actual values of physical, chemical, and/or biochemical properties for the foodstuff unit and the process conditions associated with each processing step to determine the actual thermal processing performance achieved for the foodstuff unit.

20. The method according to claim 1, wherein identifying and measuring of the composition of the foodstuff of the foodstuff unit occurs prior to the sealing of the product container.

21. The method according to claim 20, wherein the measuring of the physical, chemical, and/or biochemical properties of the foodstuff of the foodstuff unit occurs prior to the sealing of the product container.

22. A method of processing foodstuff on the basis of individual foodstuff units, the process comprising heating and cooling steps by monitoring and quantifying product performance comprising the steps of:
applying an identifier to each foodstuff unit,
identifying and measuring the composition of individual foodstuff units prior to entering the foodstuff process,
measuring physical, chemical, and/or biochemical properties of the individual foodstuff units prior to entering the foodstuff process,
calculating thermal energy requirements of the individual foodstuff units prior to entering the foodstuff process,
analyzing the properties and the thermal energy requirements of the individual foodstuff units prior to entering the foodstuff process to calculate thermal processing requirements for the processing steps of the foodstuff process,
defining process conditions for the processing steps to achieve, maintain, and control the calculated thermal processing requirements that generate a level of product quality that seeks to neither over-process nor under-process the individual foodstuff units,
monitoring the thermal processing performance for each foodstuff unit entering the foodstuff process by:
measuring the process conditions associated with the processing steps of each foodstuff unit,
analyzing the measured actual values of physical, chemical, and/or biochemical properties for the foodstuff units and the process conditions associated with the processing steps to determine the actual thermal processing performance achieved for the foodstuff units, and
comparing the calculated thermal processing requirements with the actual thermal processing performance achieved for the individual foodstuff units.

23. A method of processing foodstuff on the basis of individual containers of foodstuff, the process comprising heating and cooling steps, by monitoring and quantifying product performance, comprising the steps of:
applying an identifier to each container of foodstuff,
identifying and measuring the composition of a foodstuff product within each foodstuff container prior to entering the foodstuff process,
measuring physical, chemical, and/or biochemical properties of the foodstuff product in each foodstuff container prior to entering the foodstuff process,
calculating thermal energy requirements of the foodstuff product within each foodstuff container prior to entering the foodstuff process,
measuring physical and/or chemical properties of the foodstuff container,
calculating thermal energy requirements of the foodstuff container,
analyzing the properties and the thermal energy requirements of the foodstuff product and the corresponding product container prior to entering the foodstuff process to calculate thermal processing requirements for the processing steps of the foodstuff process,
defining process conditions for the processing steps to achieve, maintain, and control the calculated thermal processing requirements for each foodstuff container that generate a level of product quality that seeks to neither over-process nor under-process the foodstuff,
monitoring the thermal processing performance for each foodstuff product and corresponding product container combination entering the foodstuff process by:
measuring the process conditions associated with the processing steps of the foodstuff product and corresponding container combination,
analyzing the measured actual values of physical, chemical, and/or biochemical properties for the foodstuff product and corresponding foodstuff container combination and the process conditions associated with the processing steps to determine the actual thermal processing performance achieved for the foodstuff product and corresponding foodstuff container combination, and
comparing the calculated thermal processing requirements with the actual thermal processing performance achieved for each foodstuff product and corresponding foodstuff container combination.

* * * * *